United States Patent

Hollstein

[15] 3,681,384
[45] Aug. 1, 1972

[54] PROCESS FOR PREPARING PHTHALIMIDINES

[72] Inventor: Elmer J. Hollstein, Wilmington, Del.

[73] Assignee: Sun Oil Company, Philadelphia, Pa.

[22] Filed: Sept. 17, 1970

[21] Appl. No.: 73,183

[52] U.S. Cl. ...................... 260/325, 260/293.54
[51] Int. Cl. .............................. C07d 27/50
[58] Field of Search .................... 260/325, 281

[56] References Cited

UNITED STATES PATENTS 3,296,276  1/1967  Sherlock ................ 260/325

*Primary Examiner*—Alex Mazel
*Assistant Examiner*—Joseph A. Narcavage
*Attorney*—George L. Church, Donald R. Johnson, Wilmer E. McCorquodale, Jr. and Paul Lipsitz

[57] ABSTRACT

A process for the preparation of lactams which comprises hydrogenating the diammonium salt of an ortho or meta aromatic dicarboxylic acid in the presence of a catalyst combination of Raney cobalt and palladium supported on carbon.

5 Claims, No Drawings

PROCESS FOR PREPARING PHTHALIMIDINES

This invention relates to an improved process for making lactams from aromatic dicarboxylic acids. Heretofore, complex methods were required to prepare such lactams. For example, hexahydrophthalimidine has been prepared previously by the method disclosed by Christol et al., Bull. Soc. Chim. France 1966, Volume 8, Page 2535–41 (see also Chemical Abstracts 66:2250n). In this prior technique, 2-chloromethyl-1-cyanocyclohex-4-ene in ethanol is heated under pressure with ammonia to give 39 percent yield of the tetrahydrophthalimidine compound which is subsequently hydrogenated in methanol to give cis-hexahydrophthalimidine.

In contrast, the process of this invention permits preparation of hexahydrophthalimidine and similar lactams by a simple procedure involving hydrogenation of an aqueous solution of the diammonium salt of an ortho or meta aromatic dicarboxylic acid in the presence of a catalyst combination of Raney cobalt and palladium supported on carbon.

As indicated, the lactams prepared by the process of the invention are derived from ortho or meta aromatic dicarboxylic acids and these may be characterized by the formula $Ar-(COOH)_2$ where Ar is an aromatic nucleus such as benzene, naphthalene, anthracene, and the like, and the carboxylic acid substituents are in an ortho or meta position. The lactam products obtained by the process have the general formula

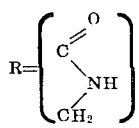

where R is a saturated ring system such as cyclohexane, decalin, perhydroanthracene and the like.

The diammonium salt of the dicarboxylic acid is readily obtained by the addition of two moles of ammonium hydroxide to one mole of the acid. However, in the process of the invention it is useful to employ additional ammonia in order to ensure an alkaline reaction mass. The amount of excess ammonia is not critical, but need not exceed 20 moles per mole of acid salt.

Both Raney cobalt and palladium on carbon are well-known catalytic materials. As used in the process of this invention the Raney cobalt co-catalyst will be, generally, in excess because it is easily poisoned. However, a 1:1 weight ratio of cobalt to palladium may be used in which case the diammonium salt solution is preferably first treated with carbon to remove any catalyst poisons.

In carrying out the reaction the diammonium salt of the acid is charged to the reactor and aqueous ammonium hydroxide (usually about 28 percent by weight) is added and then the catalyst are added. The reactor is then closed and pressured with hydrogen to a pressure of about 500 to about 1,000 p.s.i.g. The reaction mass is then heated to a temperature range of from about 150° to about 300° C., about 250° C. being preferred and hydrogen pressure is increased to about 2,000 to 4,000 p.s.i.g. and maintained at that pressure for the entire reaction time which normally runs from about two to about eight, usually about 4 hours. The product is readily recovered by usual techniques (e.g., crystallization) from its aqueous solution.

It is surprising that the process of the invention operates so cleanly to produce the saturated ring lactam product since under the hydrogenation conditions used, both carbonyl groups could be expected to be completely reduced to yield oxygen-free products.

EXAMPLE 1.

Into a one liter stainless steel rocking autoclave one mole of the diammonium salt of isophthalic acid (previously prepared by addition of two moles of ammonium hydroxide to one mole of isophthalic acid), 200 mls of 28 percent ammonia hydroxide, 50 gms of Raney cobalt, and 5 gms of 5 percent palladium on carbon are charged. The reactor is closed and further charged with hydrogen to the pressure of 1,200 p.s.i.g. The autoclave then heated to 250° C. and hydrogen pressure increased to 3,500 p.s.i.g. and held at that pressure for 4 hours. From observations of pressure drop during the reaction it is indicated that about 5 moles of hydrogen were absorbed.

The reaction mass is then cooled, filtered, and the filtrate cooled to permit crystallization of the hexahydroisophthalimidine product. Melting point (166° C.) and analysis by NMR and infrared confirm the product as cis-hexahydroisophthalimidine.

EXAMPLE 2

In a 3 gallon stirred autoclave phthalic anhydride (3,700g) is hydrolyzed with water (4,250g) to phthalic acid and then 11,000g of concentrated $NH_4OH$ (28 percent $NH_3$) is slowly added to prepare the diammonium salt. Catalyst of 450g. of Raney cobalt and 50g. of palladium on carbon is added, the autoclave closed, pressured with hydrogen and held at 230° to 260° C. for 7 hours at 3,000 to 4,000 p.s.i.g. hydrogen pressure. On cooling and work-up by distilling off ammonia and water and subsequent distillation at 123° C. at 2 mm of mercury pressure, hexahydrophthalimidine is obtained in yield of about 60 percent by weight.

In similar manner the diammonium salts of naphthalene-1,-2-dicarboxylic acid, naphthalene-1,3-dicarboxylic acid, anthracene-1,2-dicarboxylic acid, and anthracene-1,3-dicarboxylic acid are converted to the corresponding saturated ring phthalimidines.

The lactam products made by the process of the invention are intermediates to N-vinyl derivatives which, when polymerized are useful in dye baths for polyacrylonitrile fibers whereby improved dyeings are obtained (see U.S. Pat. No. 2,955,008 of Henry R. Mautner, Issued Oct. 4, 1960). The polymerized vinyl derivative is readily prepared by the methods disclosed in U.S. Pat. Nos. 2,265,450 of Walter Reppe, Curt Schuster, and Adolf Hartmann, Issued Dec. 9, 1941 and 2,335,454 of Curt Schuster, Rudolf Sauerbier and Hans Fikentscher, Issued Nov. 30, 1943.

The invention claimed is:

1. The process of making saturated ring phthalimidines which comprises hydrogenating at a temperature of about 150° to about 300° C and at a pressure of about 2,000 to 4,000 psig an aqueous solution of the diammonium salt of an ortho or meta aromatic dicarboxylic acid of the formula $Ar(COOH)_2$ where Ar is an aromatic nucleous selected from the group consisting of benzene, naphthalene, and anthracene, said hydrogenation being catalyzed by a catalyst combination of Raney cobalt and palladium supported on carbon.

2. The process of claim 1 where the polycarboxylic acid is phthalic acid.

3. The process of claim 1 where the polycarboxylic acid is isophthalic acid.

4. A process as in claim 1 for preparing hexahydroisophthalimidine which comprises hydrogenating at about 150° to about 300° and at about 2,000 to about 3,500 p.s.i.g. an aqueous solution of the diammonium salt of isophthalic acid in the presence of a catalyst of Raney cobalt and palladium supported on carbon.

5. A process as in claim 1 for preparing hexahydrophthalimidine which comprises hydrogenating at about 200° to about 300°C. and at about 3,000 to about 4,000 p.s.i.g. an aqueous solution of the diammonium salt of phthalic acid in the presence of a catalyst of Raney cobalt and palladium supported on carbon.

* * * * *